United States Patent [19]

Dao

[11] Patent Number: 4,940,964
[45] Date of Patent: Jul. 10, 1990

[54] VEHICLE CONTROL AND THEFT DETERRENT WITH REMOTE TRANSMITTER

[76] Inventor: Victor Dao, 1401 N. Fawn St., Santa Ana, Calif. 92703

[21] Appl. No.: 444,988

[22] Filed: Dec. 4, 1989

[51] Int. Cl.$^5$ .............................................. B60Q 1/00
[52] U.S. Cl. ................................... 340/438; 340/460; 340/825.69; 340/539; 307/10.4
[58] Field of Search ............... 340/438, 460, 534, 539, 340/825.06, 825.31, 825.32, 825.69, 825.72, 425.5; 307/10.2, 10.4, 10.5, 10.6; 455/603; 180/173, 287

[56] References Cited

U.S. PATENT DOCUMENTS

| | | | |
|---|---|---|---|
| 3,893,069 | 7/1975 | Mason | 340/539 |
| 4,360,808 | 11/1982 | Smith, III et al. | 340/539 |
| 4,455,551 | 6/1984 | Lemelson | 340/539 |

Primary Examiner—Joseph A. Orsino
Assistant Examiner—Frank M. Scutch, III
Attorney, Agent, or Firm—Plante, Strauss, Vanderburgh & Connors

[57] ABSTRACT

There is disclosed a motor vehicle control system having a vehicle control unit located in the motor vehicle and a hand held portable control unit, which are in two-way communication. The vehicle control unit which is located in the motor vehicle includes a receiving antenna, a receiver, a decoder and a plurality of functional control circuits, with each control circuit for a respective functional operation of the motor vehicle such as ignition, starter activation, heater, air conditioner, door locks, etc. The control unit in the motor vehicle also includes a transmitter and a scanner unit which has a like plurality of sensors for sensing the condition of the various functional operations such as the ignition, engine operation, air conditioner status, heater status, etc. The control unit transmits a radio frequency signal to the remote control unit, which indicates the condition of the sensed operations. The remote control unit has an antenna and receiver with an audio amplifier and speaker. The remote unit has a standard key pad in circuit to an encoder to produce a signal that is applied to the transmitter for transmission to the vehicle control unit. In a preferred embodiment, the motor vehicle control unit has a voice synthesizer to generate a voice signal that is transmitted to the remote control unit, and most preferably has a digital voice recorder, permitting the user to customize the unit to repeat any selected message. This is particularly of value to adapt the system for foreign language users.

12 Claims, 7 Drawing Sheets

VEHICLE CONTROL AND THEFT DETERRENT WITH REMOTE TRANSMITTER

BACKGROUND OF THE INVENTION

1. Field of the Invention

This invention relates to a security device for controlling a motor vehicle and deterring theft of the vehicle and, in particular, such a security device which includes a remote, hand held control unit.

2. Brief Statement of the Prior Art

A wide variety of systems have been proposed for theft protection of motor vehicles. Very popular versions of such systems are those which include a remote, hand-held transmitter with a receiver and controller located in the motor vehicle.

Typically these devices are used with security sensors such as door, hood and trunk switches, and motion or shock sensors, etc. The remote transmitter with such devices serves to arm and disarm the deterrent system thereby permitting the owner to exit and enter the vehicle while the system is disarmed and to arm and disarm the system from a remote location.

Typical of various anti-theft devices such as described above are those shown in U.S. Pat. Nos. 4,754,255; 4,757,304; 4,763,121 and 4,740,775.

Remote units have also been combined with other functions such as a car locating function in which the remote unit can actuate the car's horn and/or lights such as shown in U.S. Pat. Nos. 4,673,921 and 4,383,242. Voice synthesizers have also been applied to a vehicle alarm system such as shown in U.S. Pat. Nos. 4,794,368 and 4,560,978.

None of the aforementioned anti-theft or automotive security systems has incorporated automotive operational functions such as turning the ignition on and off, starting the engine, controlling the air conditioner or heater of the vehicle, etc. Also, none of the prior car alarm systems has provided monitoring of the automobile operations, or broadcasting of the monitored signals to the remote unit, thereby advising the operator of the automobile's condition.

Additionally, all of the systems which have been proposed for controlling various automotive operations as theft deterrents have employed a central processing unit such as a microprocessor. Accordingly, these devices are expensive to manufacture in small quantities often requiring the manufacture of a custom integrated circuit or microprocessor.

OBJECTIVES OF THE INVENTION

It is an object of this invention to provide a motor vehicle control system with a remote control unit.

It is a further object of this invention to provide an anti-theft deterrent system which is provided with a remote hand held control unit.

It is a further object of this invention to provide a remote control unit which is provided with a receiver and transmitter to communicate with a vehicle control unit having a receiver and transmitter and located in the vehicle, thereby establishing two-way communication between the units.

It is an object of this invention to provide a motor vehicle control and anti-theft system which does not utilize complex and expensive microprocessors.

It is an object of this invention to provide a motor vehicle control system that permits remote control of the motor vehicle functional systems such as engine operation, air conditioner and heater operations.

It is further an object of this invention to provide the two-way communication capability with a voice synthesizer located in the vehicle control system.

It is a further object of this invention to provide a motor vehicle control system which continually monitors the functional operations of the motor vehicle and broadcasts their condition to the remote unit, thereby continually informing the owner of the condition of the motor vehicle.

Other and related objects will be apparent from the following description of the invention.

BRIEF DESCRIPTION OF THE INVENTION

This invention comprises a motor vehicle control system having a vehicle control unit located in the motor vehicle and a hand held portable control unit. The vehicle control system which is located in the motor vehicle includes a receiving antenna, a receiver, a decoder and a plurality of functional control circuits, each control circuit for a respective functional operation of the motor vehicle such as ignition, starter activation, heater, air conditioner, door locks, etc. The control unit in the motor vehicle also includes a transmitter and a scanner unit which has a like plurality of sensors for sensing the condition of the various functional operations such as the ignition, engine operation, air conditioner status, heater status, etc. The sensor system includes a scanning circuit which scans through the various sensor circuits and detects their condition. A detected signal is generated for each functional operation which is in circuit to an audible signal generator, which can be either a tone generator, a voice synthesizer, or a digital voice recorder/player. The audible signal generator is in circuit to the transmitter to transmit a radio frequency signal to the remote control unit. The remote control unit also has an antenna and receiver with an audio amplifier and speaker. The remote unit has a standard key pad in circuit to an encoder to produce a signal that is applied to the transmitter of the remote unit for transmission to the vehicle control unit. In a preferred embodiment, the motor vehicle control unit has a voice synthesizer to generate a voice signal that is transmitted to the remote control unit. Preferably the motor vehicle control unit also has a digital voice recorder, permitting the user to customize the unit to repeat any selected message. This is particularly of value to adapt the system for foreign language users.

DESCRIPTION OF THE DRAWINGS

The invention will be described with reference to the illustrations of which.

DESCRIPTION OF THE PREFERRED EMBODIMENT

Figure 1:
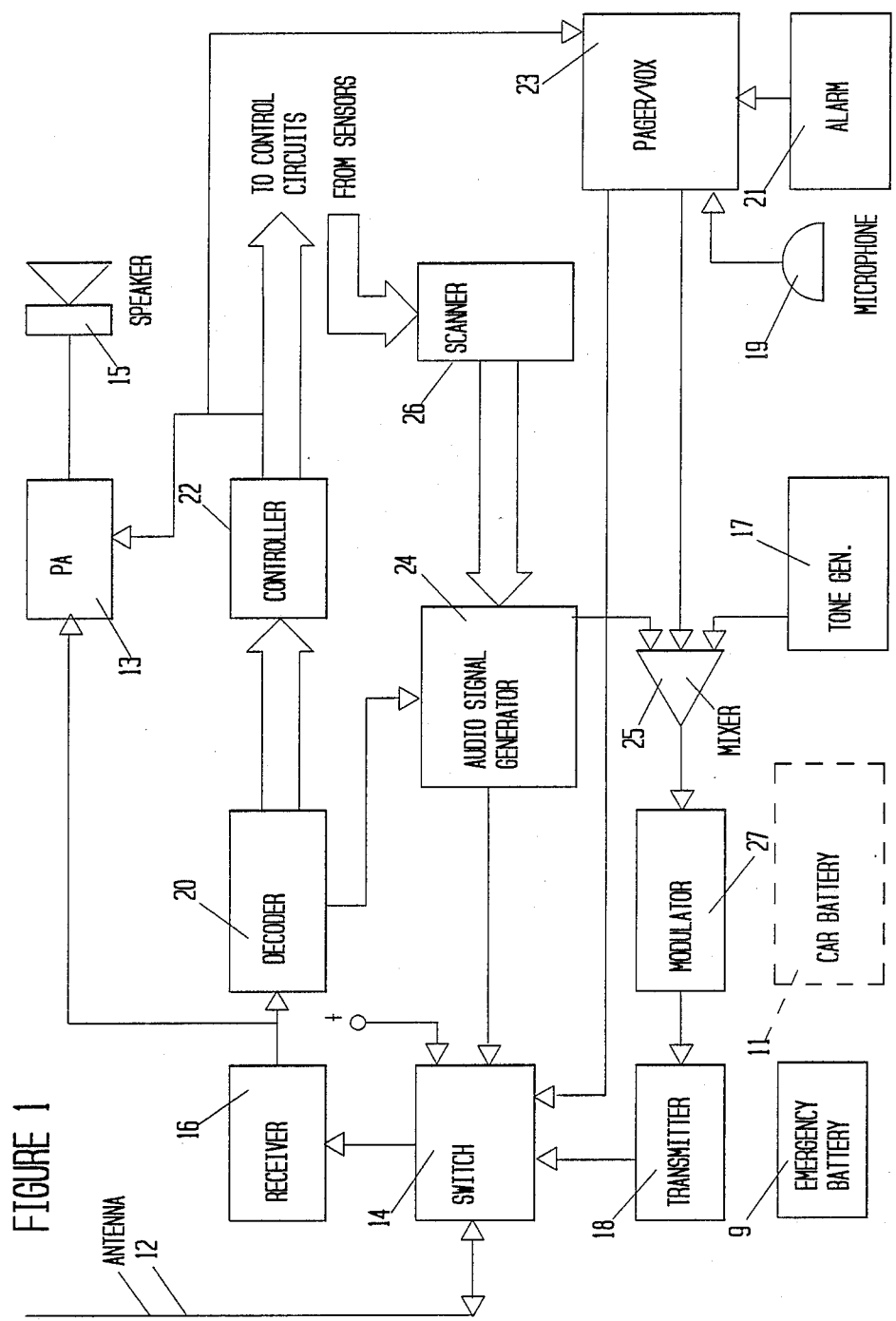
FIG. 1 is a block schematic diagram of the motor vehicle control unit.

Referring to FIG. 1, the vehicle control unit of the motor vehicle control system of this invention is shown in a schematic block diagram. The control unit is powered by the car battery 11, shown in phantom lines. Preferably, the control unit is also provided with an emergency battery 9, which maintain operation of the control unit even if the vehicle's battery malfunctions, or is disconnected.

The control unit has an antenna 12 which is in circuit through a switch 14 to a receiver 16 or a transmitter 18. The receiver 16 is a radio broadcast, preferably frequency modulated, receiver which is tuned to a preselected frequency. The signal received and processed by the receiver is applied to the input of a decoder 20.

The decoder 20 compares the input signal to a preselected numerical code. Preferably the code is five digits which are selectable from any of 16, one and two digit numbers, which provides in excess of on million possible codes. When the decoder successfully compares a received signal that to its preset code, it transmits the input signal to the controller unit 22. The input signal is also transmitted to an audio signal generator 24, which can be a tone generator, a voice synthesizer, or a digital voice recorder/player.

The signal received by the control unit 22 is applied to the respective functional control circuit such as the ignition circuit, engine starter circuit, heater/air conditioner circuit, etc. The application of the signal to the functional control circuit results in activation of that circuit and completion of the function, e.g., turning on the ignition, starting the engine, etc.

The control unit 22 also has a scanner unit 26 which is provided with a plurality of functional operations sensors. The scanner unit 26 continually scans the condition of these sensors and generates a status signal when other than the default status is sensed, e.g., when the ignition is on, the engine is operating, etc. The status signal generated by the scanner unit 26 is applied to the audio signal generator 24. The audio signal generator 24 receives signals from the scanning unit 26 and from the decoder 20 and generates an audio signal in response thereto. Preferably, the audio signal generator 24 is a voice synthesizer, however, any other audio tone generator can be used.

Figure 2:
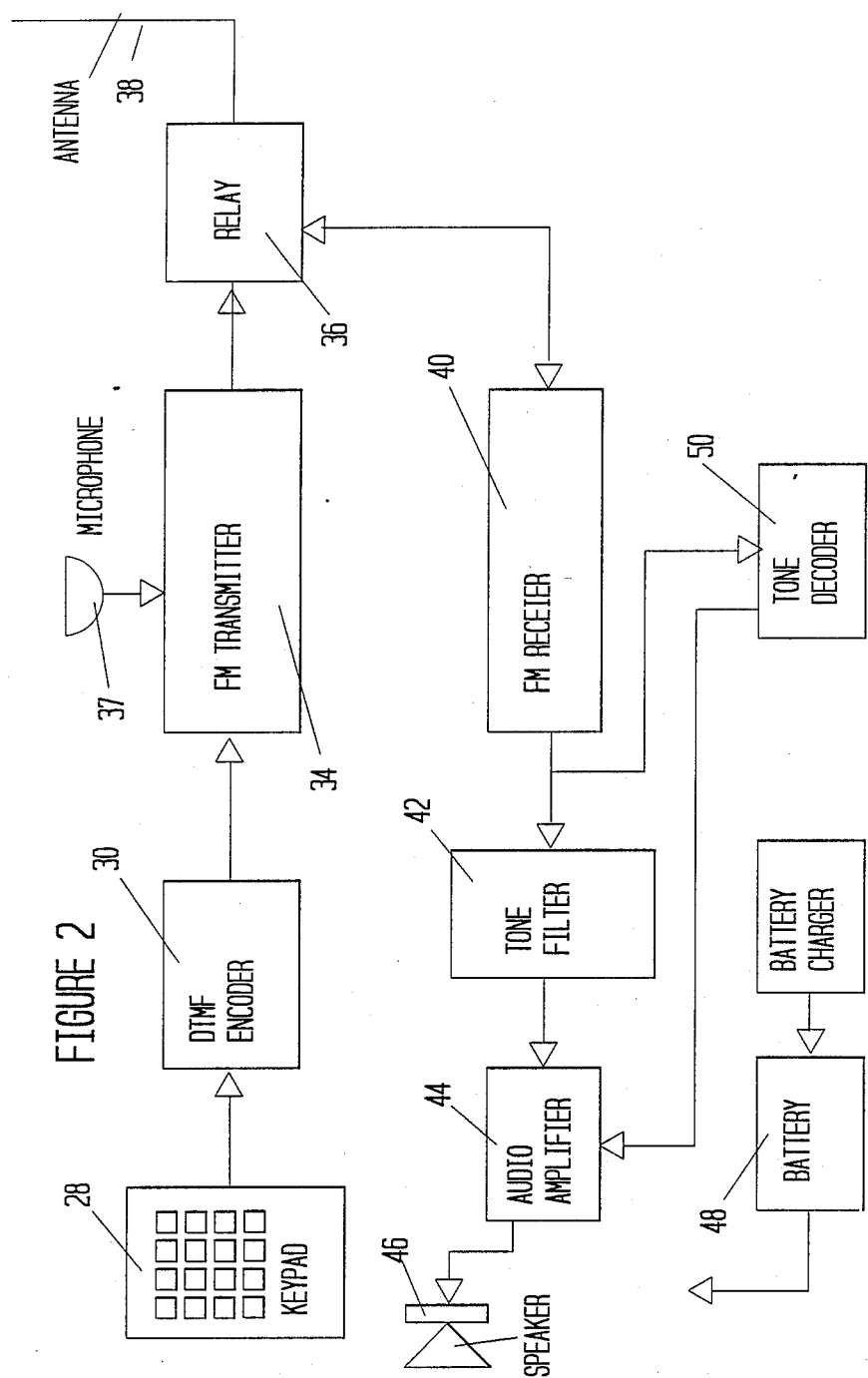
FIG. 2 is a block schematic diagram of the remote hand held control unit.

The audio tone is applied through a mixer 25 and a modulator 27 to the transmitter 18 which generates a radio frequency signal of a preset frequency which is permanently tuned in the hand held receiver unit, shown in FIG. 2. This radio frequency signal is applied through the switch 14 to the antenna 12 which thus serves both as a receiving and transmitting antenna.

The mixer 25 also receives an input signal from a pager unit 23 in the event that the alarm 21 or microphone 19, which are located in the automobile, sense any intrusion or unauthorized motion of the automobile. The alarm 21 can be any conventional alarm with sensors such as door, hood or trunk lid switches, or a motion or shock sensor. The microphone can be located in the vehicle with a sensitivity to sense voices within the interior of the vehicle.

A tone generator 17 is provided and is preset to generate an audio tone of a preset frequency which matches the tone frequency of the hand control unit; see FIG. 2. The frequency of this generator matches the characteristic tone of the particular hand control unit with which it is paired, to establish recognition and communication with the hand control unit. The signal from this tone generator 17 is also applied to the mixer 15.

As a further alarm mechanism, the system can have a public address system 13 with a speaker 15 which can be the speaker of the audio system of the automobile, or can be a dedicated speaker which can be located in the engine compartment or other position on the automobile.

Referring now to FIG. 2, there is illustrated a schematic block diagram of the hand held remote control unit. The remote control unit also has a contained power source such as a conventional rechargeable battery 48 and a conventional battery charger. The remote control unit has a conventional key pad 28, typically with 16 numerical keys, a power switch and the like. The key pad 28 is in circuit to a dual tone encoder unit 30 which generates a coded signal that includes a tone signal of the frequency which is preset in the control unit of the vehicle. The encoder unit 30 is in circuit to a transmitter 34 to generate a modulated frequency radio signal at the receiving frequency of the receiver 16 in the vehicle control unit. This signal is applied through a reversing switch of relay 36 to the antenna 38 of the remote control unit.

The hand held remote control unit also has a receiver 40 which is in circuit through the reversing switch of relay 36 to the antenna 38. The receiver 40 is in circuit through a tone filter 42 to an audio amplifier 44 that drives a small speaker 46 within the hand held remote control unit. A tone decoder unit 50 is provided in circuit to receive the signal from the receiver 40 and in circuit to the audio amplifier 44 to broadcast an audio tone signal from speaker 46.

Figure 3:
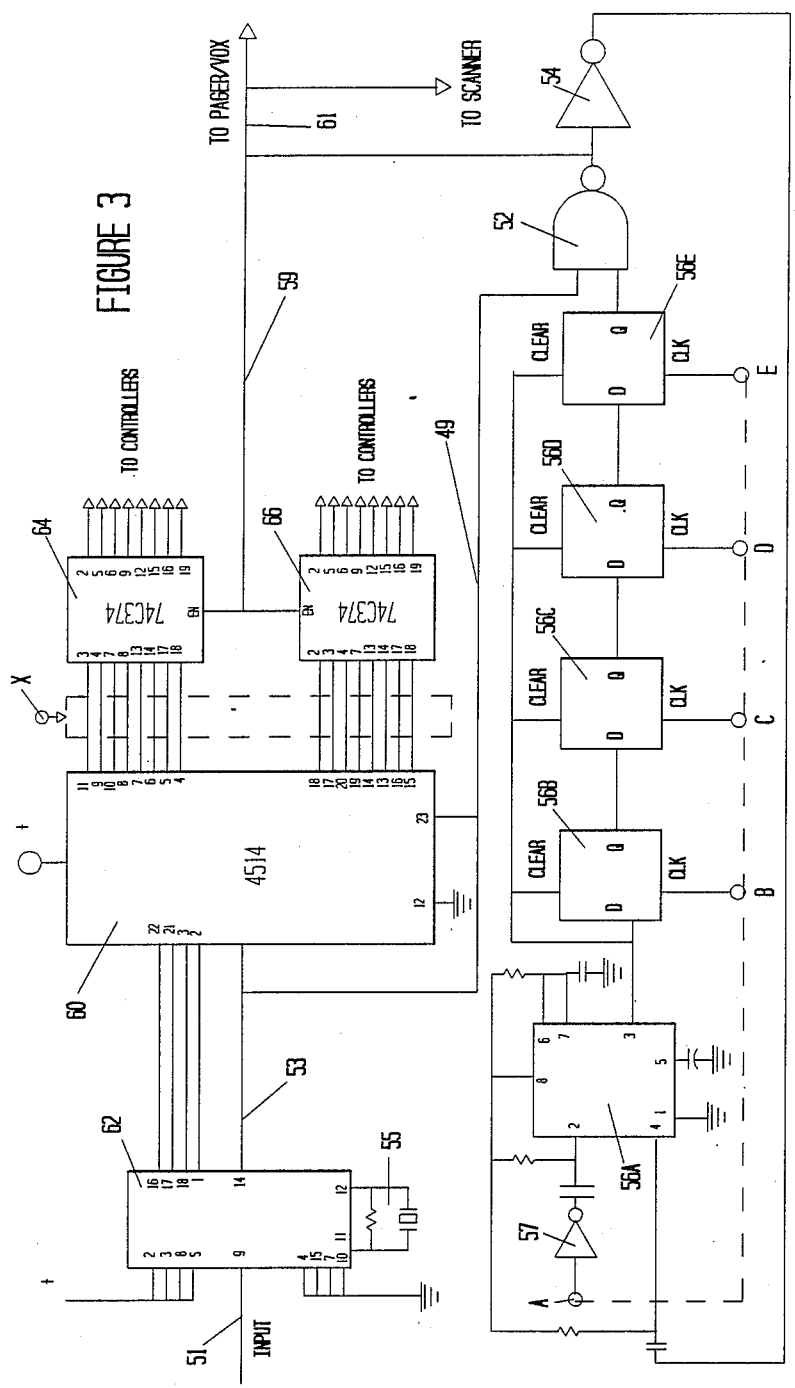
FIG. 3 is a schematic diagram of the decoder circuit.

Referring now to FIG. 3, the decoder unit 20 is illustrated. The circuit of the decoder unit includes a dual tone decoder 62, a binary to decimal decoder 60, latches 64 and 66, and five data shift registers 56A, 56B, 56C, 56D and 56E. Each of the registers can store one of sixteen digital numbers thereby providing in excess of one million possible codes or combinations of the digital signals. The code is user selected by connecting points A, B, C, D and E with jumpers (not shown) to selected ones of the output lines from the binary to decimal decoder 60 to the latches 64 and 66. This is shown in the phantom lines and point X on FIG. 3.

The dual tone input signal which is received from the receiver 16 is applied to pin 9 of the dual tone decoder 62 through line 51. A crystal tuned oscillator 55 controls the operating frequency of the decoder 62. The strobe output signal from the decoder 62 is applied through line 53 to pin 1 of the binary t decimal decoder 60, and through line 57 to AND gate 52 and invertor 54 to the first data shift register 56A. As previously mentioned, each of the input terminals of the succeeding registers is connected to a preselected one of the sixteen output terminals of the binary decimal decoder. The connection of the inputs to the timers to any of the sixteen output terminals of the binary decimal decoder is done by the user, permitting the user to preselect a specific code which recognizes the signal that is received from the hand held unit.

Each of the registers has an internal timer which provides a preset or preselected time delay, typically from 0.5 to about 3 seconds for the user to enter the required numerical code from the key pad of the hand unit. If within the allotted time period, additional numbers are entered by the user which match the succeeding stages 56B, 56C, 56D, and 56E, the circuit will allow the function codes to be entered. If, however, the user fails to enter the sequence of digits required for the succeeding stages 56B-56E, or fails to enter the digits within the preallotted time, the unit resets and the user must again try to enter the proper sequence of digits.

If the proper code sequence is received, which comprises five code pulses which are any of the sixteen digits of the numerical key pad, the clock circuit is effective to cause the output of the NAND gate to go high which this signal is applied to the enabling terminal of the latches, turning the latches on and permitting transmission of the next digit of the transmitted signal to be applied through the latch and to the appropriate controller through the output circuits.

Each of the latches has eight output lines which extend to controllers for various functional operations of the vehicle as described hereinafter. A confirming return signal is also passed through line 61 to the scanner unit 26 (see FIG. 1).

Figure 4:
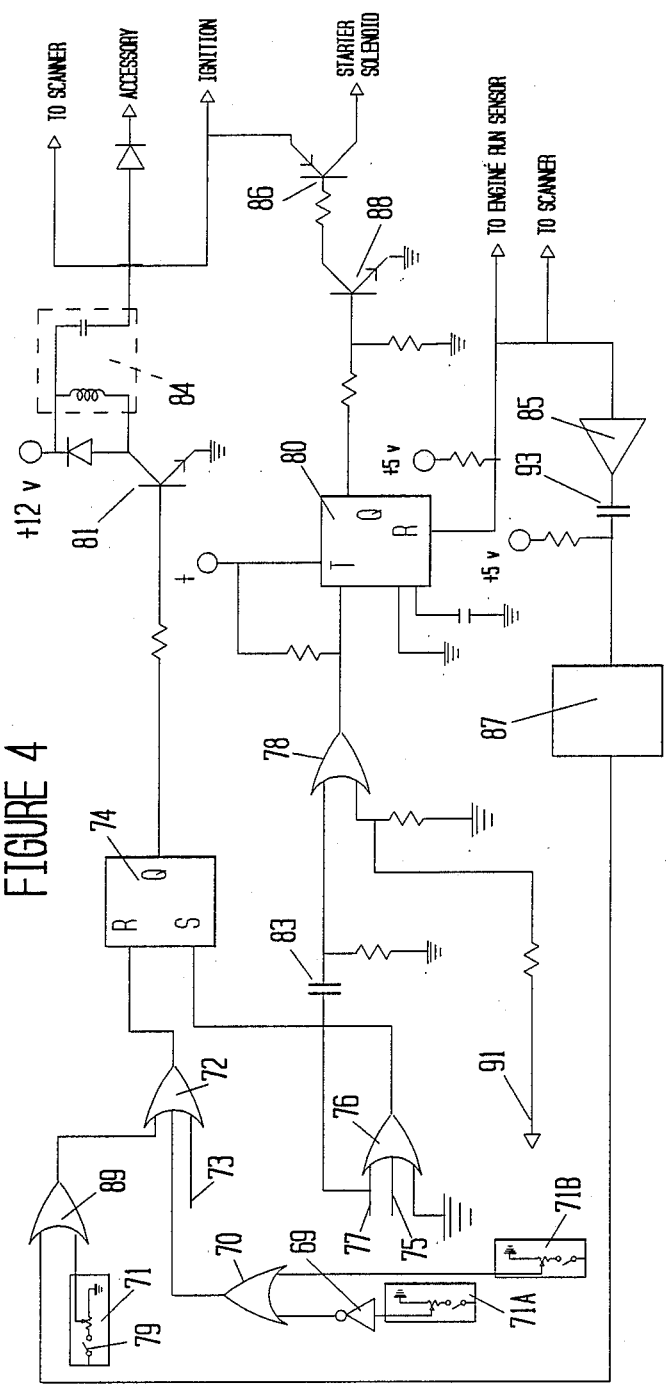
FIG. 4 is a schematic diagram of the ignition control and engine starter circuit.

Various vehicle functional control circuits are provided. FIG. 4 illustrates the ignition and start-engine circuit for the system. This circuit receives an ignition-off signal through line 73 from the latch 64 or 66 (see FIG. 3) of the decoder unit 20 and receives an ignition-on signal from latch 64 or 66 through line 75. It also receives a start-engine signal through line 77 from latch 64 or 66.

The ignition-on signal and start-engine signals are applied to OR gate 76, and a signal received on either of these lines causes the output of the OR gate 76 to go high. This output is applied to the set terminal of flip flop 74. The output of the flip flop 74 biases transistor 81 into conducting. The transistor is in circuit with the 12-volt battery of the motor vehicle and the coil of normally open relay 84, which closes the relay contacts and completes the 12-volt supply through the accessory and ignition contacts of the ignition switch of the motor vehicle.

The ignition circuit also has a disabling circuit which comprises OR gate 72. As previously mentioned an ignitionoff signal is applied from the latch 64 or 66 through line 73 to the OR gate 72. The OR gate 72 also receives a signal from OR gate 89, which receives signals from a brake microswitch circuit 71 and from a engine feedback circuit.

The brake microswitch is normally open and is closed when the brake pedal of the vehicle is depressed. The circuit 71 includes a voltage divider to produce a 5 volt voltage signal when the brake microswitch 79 is closed by depressing the brake pedal. This signal is applied to the OR gate 89, and the output from OR gate 89 is applied to OR gate 72, thereby insuring that the ignition will be turned off when the brake pedal is depressed. In the event that an intruder is successful in starting the vehicle, the vehicle engine will be shut off as soon as the intruder depresses the brake pedal.

An engine feedback circuit is also provided which receives a signal from the engine sensor that indicates engine operation. That signal is applied to the input of buffer 85. In the event the engine stops, the signal applied to the buffer 85 goes low. The signal is converted into a one shot signal by capacitor 93. The one shot signal is applied to the input terminal of a timer 87. When timer 87 receives a low signal it turns on and outputs a signal for a predetermined period, e.g., 5 to 10 seconds. The timer output signal is applied to OR gate 89. When the signal applied to OR gate 89 is high, the ignition is turned off for the preset time interval.

A normally closed microswitch is provided on the shift lever and is opened when the shift lever is in park or neutral. This microswitch is in a voltage divider circuit 71B. The output of circuit 71B is applied to OR gate 70 which is in circuit to the input of OR gate 72. Also in circuit to OR gate 70 is a hand brake circuit 71A. The microswitch of this circuit is normally open and is closed when the hand brake is set. The output of this circuit is applied through invertor 69 to the OR gate 70. When the hand brake is not set or the shift lever is not in neutral or park, the output of OR gate 70 is caused to go high which is applied to the input terminal of the OR gate 72. This causes the output of the OR gate 72 to go high and resets the flip flop, breaking the circuit to the switch transistor 81, thereby insuring that the engine cannot be started. In a similar fashion, an input signal from the ignition off circuit of the latch, or from the brake pedal circuit 70 will also cause the output of the OR gate 72 to go high, resetting flip flop 74.

The start-engine signal from latch 64 or 66 is applied to the OR gate 76 to turn the ignition on through the flip flop 74. The start-engine signal is also applied as a one-shot signal through capacitor 83 to the input of OR gate 78. The OR gate 78 also receives an input signal from the manual ignition switch of the vehicle. When the output of OR gate 78 goes high it is applied to the trigger terminal of timer 80, which is set for a predetermined time delay, e.g., three seconds. The time duration of this timer is variable and can be set by the vehicle owner to provide the optimum cranking duration for the starter engine of the particular motor vehicle.

The output of the timer 80 is applied to the base of a switch transistor 88 that is in series with the base of a switching transistor 86 which is in circuit to the solenoid of the starter motor.

The starter circuit also has a feedback circuit which extends to the sensor of the sensing circuit, described hereinafter for sensing engine operation and to the sensor circuit of the motor control unit.

Figure 5:
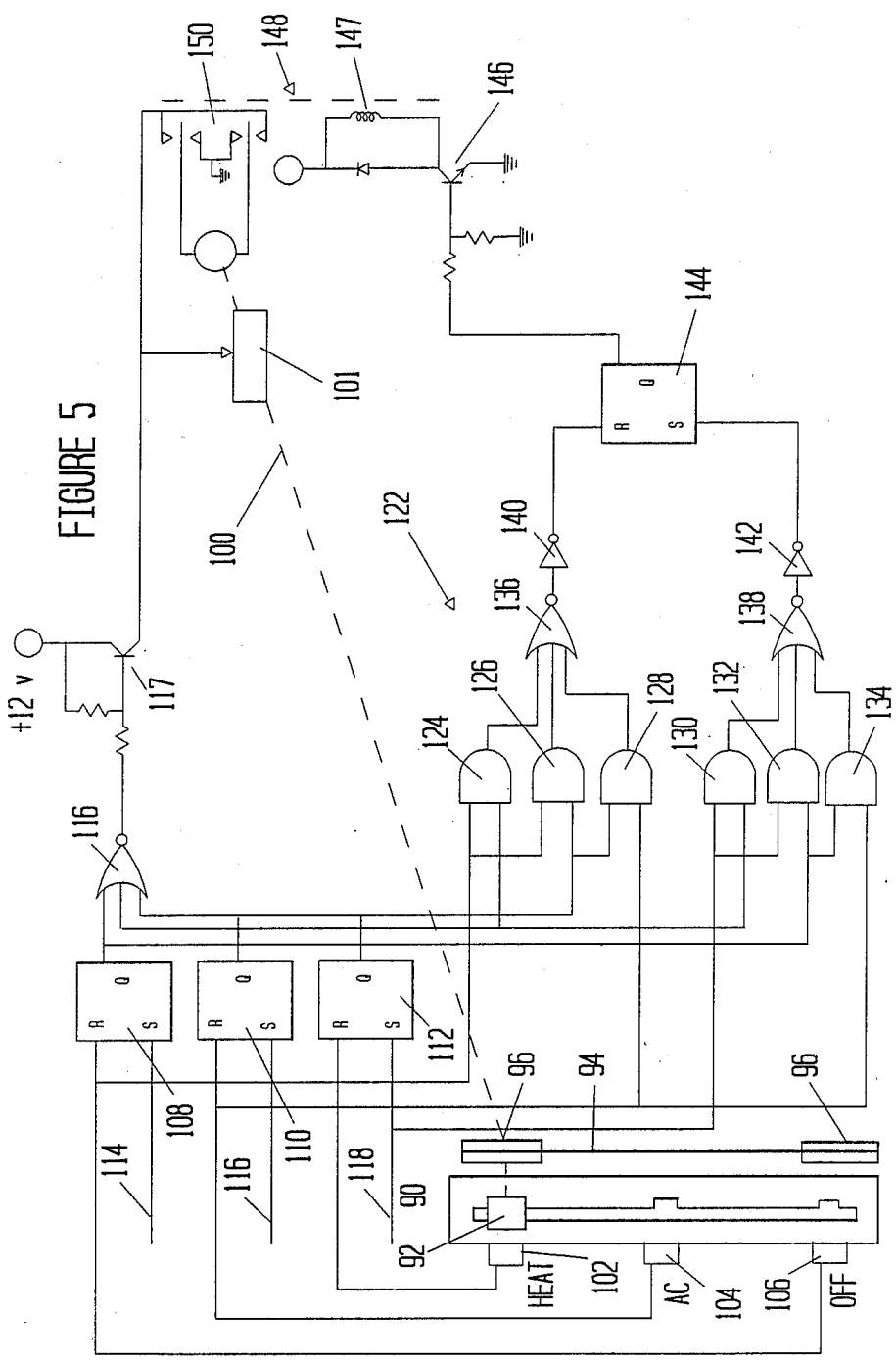
FIG. 5 is a schematic diagram of the heater and air conditioner circuit.

Referring now to FIG. 5, there is illustrated the control circuit for the heater and air conditioner of the vehicle. The vehicle has a customary selector 90 with a slide lever 92 that can be moved between an off position, a heater position and an air conditioner position. The selector 90 is provided with an actuator which comprises a cable 94 that extends over pulleys 96 at opposite ends of the selector and that is mechanically coupled by clutch 101 to the selector lever 92. The cable 94 is driven with a reversible electrical motor 98 which is mechanically coupled to the cable as shown by the dashed line 100.

Microswitches 102-106 are provided at the off, heater and air conditioner positions on the selector. These microswitches are in voltage divider circuits (not shown) which are essentially the same as divider circuit 71 shown in FIG. 4. The outputs of the microswitch circuits are applied to the reset terminals of flip flops 108-112. The flip flops also receive signals from the latches 64 and 66 through lines 114-118. The off signal is applied through line 114 to flip flop 108, the air-conditioner-on signal is applied to flip flop 110, and the heater-on signal is applied to flip flop 112. The outputs of the flip flops are applied to NOR gate 116 which is in circuit to the base of switch transistor 117. If the signal to any of the input terminals of the NOR gate 116 is high, the output of the NOR gate 116 goes low and causes switch transistor 117 to conduct, which engages the clutch 101 of the motor 98.

The direction of rotation of the motor 98 is controlled by a circuit 122 that includes AND gates 124-134 which receive the signals from the microswitch circuits 102-106. The AND gates 124-134 are in circuit to NOR gates 136-138 and through invertors 140-142 are applied to the terminals of flip flop 144. The output of the flip flop 144 is applied to the base of switch transistor 146 which is in circuit between the 12 volt vehicle battery and the coil 147 of solenoid switch 148. Activation of the relay 148 causes switching of the double pole, double throw contacts 150, reversing the direction of the motor 98 driving the selector lever actuator.

Figure 6:
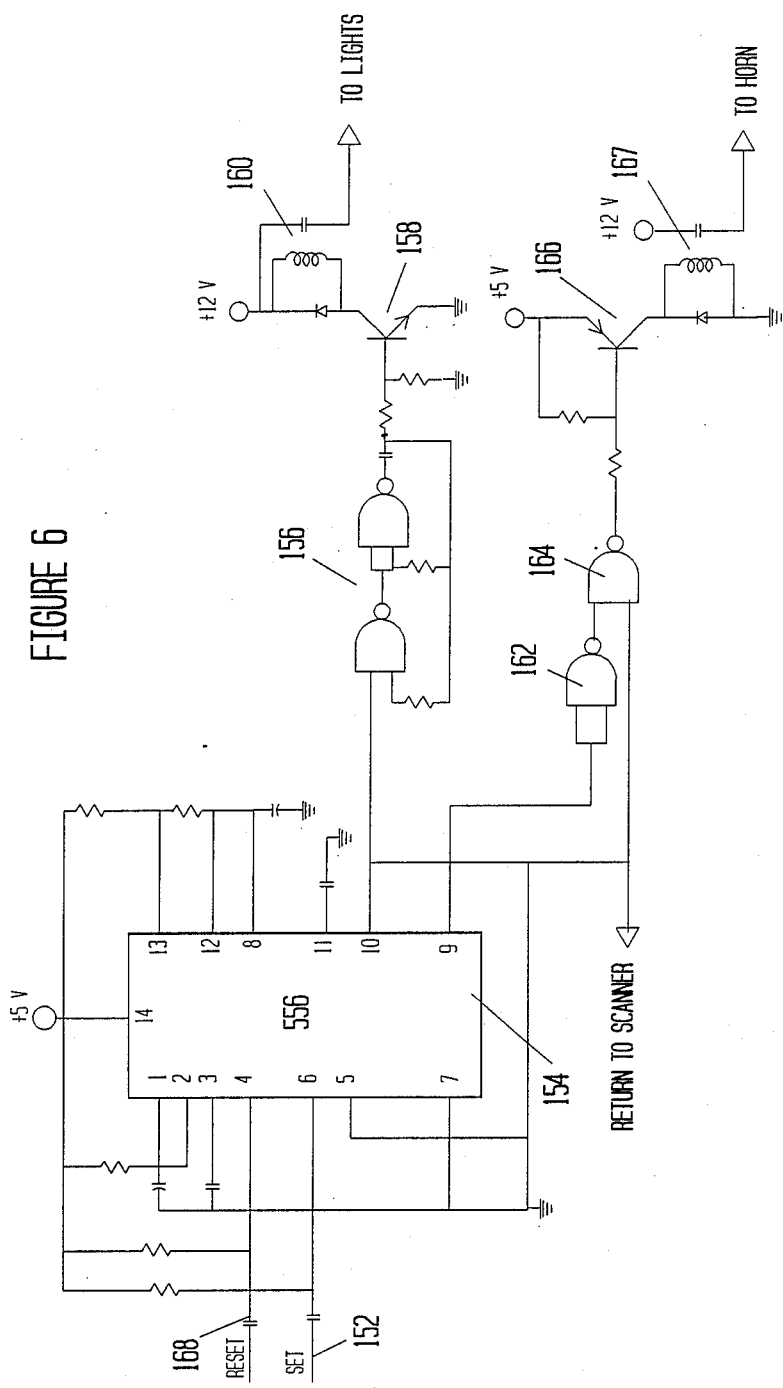
FIG. 6 is a diagram of the horn and light control circuit.

FIG. 6 illustrates the locator circuit for the system, which activates the horn and/or lights of the vehicle upon receiving a command from the remote control unit. The circuit receives a locate signal from latch 64 or 66 which is applied through line 152 to pin 6 of a timer 154. When a signal is received, pin 5 is turned on, and an oscillating signal is produced at pin 9. The input signal also allows the external oscillator circuit 156 which controls the light circuit to oscillate at a preset frequency, e.g., from 1 to 10 Hz. The output of the oscillator circuit 156 is applied to the base of transistor 158 which is biased into conducting, closing the switch contacts of relay 160 and flashing the vehicle lights at the preset frequency between 1 and 10 Hz. The internal oscillator of the timer 154 is set for a frequency of about one-third that of oscillator circuit 156, and it is in circuit to a horn control circuit that includes NAND gates 162-164 which are in circuit to the base of switch transistor 166, which is biased into conducting, closing the switch contacts of relay 167. The transistor 166 only conducts at the frequency of the internal oscillator of the timer, so the vehicle's horn will sound for a shorter duration than the period of flashing of the vehicle's lights. The timer 154 is preset for a duration up to about 1 minute and then automatically resets. A reset signal can also be received through line 168 from the latch 64 or 66, which is generated by the control unit in response to a locator-off signal transmitted from the remote unit.

Figure 7:
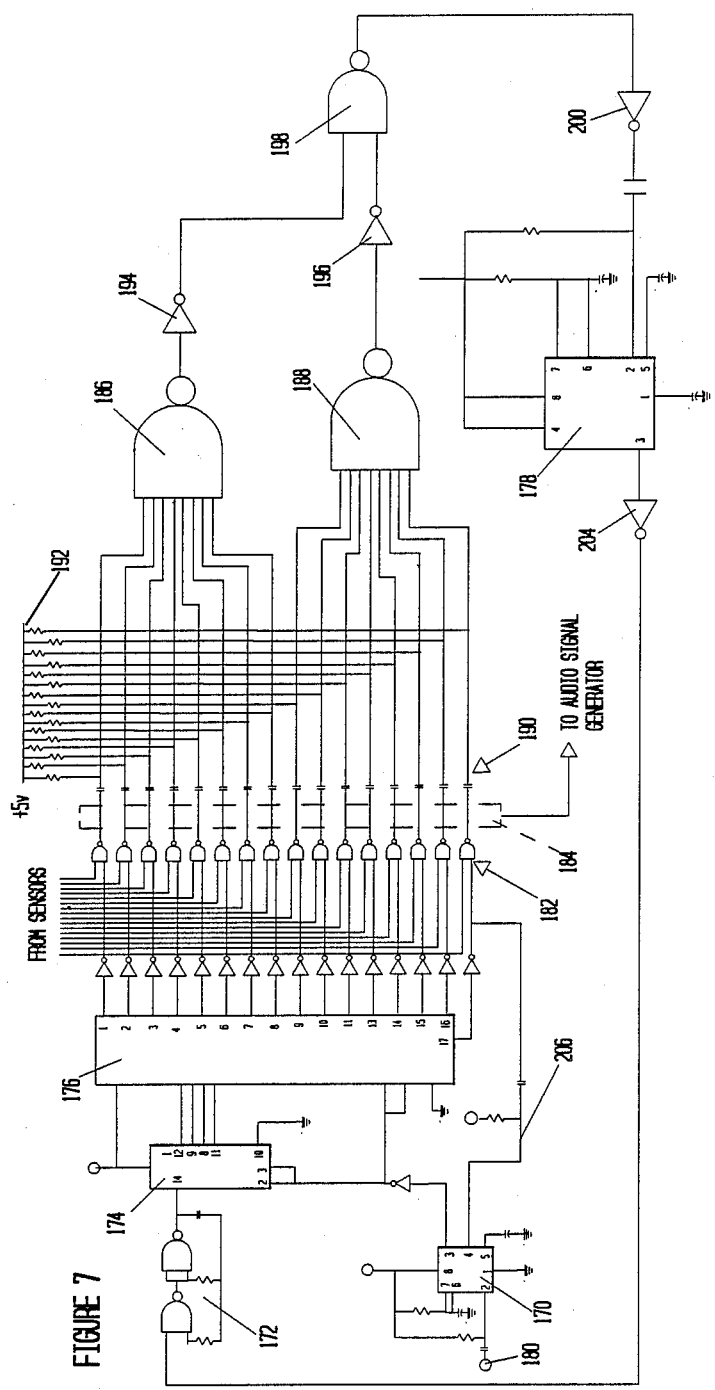
FIG. 7 is a diagram of the scanning circuit for use with a tone generator.

Referring now to FIG. 7, the scanning circuit will be described. The circuit includes timer 170, oscillator 172, counter 174, binary to decimal decoder 176, and timer 178. The input signal from point X shown on FIG. 3 is received through line 180 and is applied to pin 2 of timer 170. The timer 170 is set for a two minute time delay and it turns on counter 174. Sensors in the vehicle generate return signals at other than default status, e.g., when the ignition is on, when the air conditioner is on, when the motor has started, etc. Those sensed signals are applied to the inputs of NAND gates, generally identified as 182, together with the inverted outputs from the binary to decimal decoder 176. The outputs of the NAND gates 182 are sent to the audio signal generator 24 as indicated by the broken line box identified as 184, which represents a 16 line bus. The outputs of the NAND gates 182 are also in circuit to NAND gates 186-188 through respective capacitors, generally labelled as 190. The capacitors 190 provide a one shot signal input to the NAND gates 186-188, the duration of which is determined by the charge time of the capacitors. The NAND gates 188 are also provided with a signal from the 5 volt bus 192 of the control circuit. The output terminals of the NAND gates 186-188 are applied through invertors 194-196 to the input terminals of NAND gate 198. The output of the NAND gate 198 is applied, through invertor 200 to pin 2 of timer 178. The timer 178 is preset for a 2 second delay to provide signal transmission time. The output signal from the timer 178 is applied thorough invertor 204 to the input of oscillator 172. The timer of the scanner circuit provides a two minute period to complete scanning of all the sensor circuits. If the scanning is completed before 2 minutes, the timer 170 is reset by a signal through line 206.

Although not illustrated, the control circuit can be applied to control many additional functions of a vehicle using similar control circuits. Thus the public address system can be activated, and the user can talk into the microphone 37 of the remote unit and the user's voice will be broadcast by the public address system in the vehicle, a technique which can be used to frighten intruders away from the vehicle. Controls for the door locks can be provided and the remote unit can send a lock signal and an unlock signal to control the door locks. The defogger of the vehicle can similarly be turned on and off by the remote unit by providing a suitable control circuit for this function.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A theft deterrent system and remote control for a plurality of vehicle functional operations, in which the vehicle has an electrical system including an ignition system, an electrical engine starter and a heating or cooling system which comprises
a. a vehicle control system mounted in the vehicle, in circuit to the battery of said vehicle, and including:
   (1) a vehicle receiver and antenna to receive a selected band of radio frequency broadcast control signals;
   (2) a decoder in circuit to said receiver to process a received signal and to recognize a preselected coded signal;
   (3) a plurality of controller circuits, one each for each of the automotive functional operations to enable operation of one of the ignition system, engine starter, and heating or cooling systems of said vehicle, each responsive to a preselected signal code and each having an output control operative to actuate its respective functional operation under control;
   (4) a conditions scanning circuit having a plurality of sensors, one each for each of the automotive functional operations of ignition system, engine starter, and heating or cooling systems and responsive thereto to generate a return signal;
   (5) an audible signal generator responsive to said conditions scanning circuit to generate an audible tone of a preselected frequency;
   (6) a vehicle transmitter in circuit to said tone generator and operative to transmit a second selected band of radio frequency signal in response thereto;
b. a hand-held remote control unit, having a self containing electrical power source, and including:
   (1) a keypad comprising a plurality of key switches;
   (2) an encoder in circuit to said key switches and responsive thereto to generate a coded signal;
   (3) a remote transmitter in circuit to said encoder and responsive thereto to generate and transmit a radio frequency signal of said first frequency containing said coded signal;

(4) a remote receiver and receiving antenna to receive said return signal; and (5) a tone decoder and audio speaker in circuit to said receiver and responsive thereto to generate an audible tone.

2. The theft deterrent and vehicle control system of claim 1 wherein said audible signal generator of said vehicle controller system is also in circuit to said decoder and responsive thereto to generate a tone signal of a preselected audible tone to enable said receiver and control system to broadcast a return signal that confirms receipt of said control signal.

3. The theft deterrent and vehicle control system of claim 2 wherein said audible signal generator is a voice synthesizer.

4. The theft deterrent and vehicle control system of claim 1 including an alarm on said vehicle and responsive to intrusion or movement of said vehicle to generate an alarm signal which is broadcast to said remote unit.

5. The theft deterrent and vehicle control system of claim 1 including, in said vehicle control system, a audio vehicle amplifier in circuit with said decoder and a vehicle audio speaker in circuit and driven by said vehicle amplifier to broadcast an audio alarm signal.

6. The theft deterrent and vehicle control system of claim 1 wherein said plurality of controller circuits of said vehicle control system includes a door lock circuit effective to lock and unlock the doors of the vehicle.

7. The theft deterrent and vehicle control system of claim 1 wherein said plurality of controller circuits of said vehicle control system includes a headlight control circuit operative to turn the headlights of the vehicle on and off.

8. The theft deterrent and vehicle control system of claim 1 wherein said plurality of controller circuits of said vehicle control system includes a circuit operative to turn the rear window defogger on and off.

9. The theft deterrent and vehicle control system of claim 1 wherein said plurality of controller circuits of said vehicle control system includes a circuit operative to sound the horn of said vehicle.

10. The theft deterrent and vehicle control system of claim 1 wherein said vehicle control system has a single antenna and includes a switch in circuit therewith and operative to switch said antenna between said receiver and said transmitter.

11. The theft deterrent and vehicle control system of claim 1 wherein said remote control unit has a single antenna and includes a switch in circuit therewith and operative to switch said antenna between said receiver and said transmitter.

12. The theft deterrent and vehicle control system of claim 1 including, in said remote control unit, a remote unit audio frequency amplifier in circuit with said decoder and a remote unit audio speaker in circuit and driven by said remote unit audio amplifier to broadcast an audio alarm signal.

* * * * *